United States Patent [19]

Grassl et al.

[11] Patent Number: 5,014,336
[45] Date of Patent: May 7, 1991

[54] MOTOR CONTROL

[75] Inventors: Alfred Grassl, Richterswil, Switzerland; Erhard Knorr, Wiesloch, Fed. Rep. of Germany

[73] Assignee: Kontron Instruments Holdings NV, Schottegatwegoost, Netherlands Antilles

[21] Appl. No.: 478,734

[22] Filed: Feb. 9, 1990

Related U.S. Application Data

[63] Continuation of Ser. No. 328,796, Mar. 27, 1989, abandoned, which is a continuation of Ser. No. 225,656, Jul. 15, 1988, abandoned, which is a continuation of Ser. No. 126,644, Dec. 1, 1987, abandoned.

[30] Foreign Application Priority Data

Dec. 4, 1986 [CH] Switzerland ............... 4847/86

[51] Int. Cl.⁵ ............................................. H02P 1/18
[52] U.S. Cl. ..................................... 388/843; 318/274
[58] Field of Search ............. 318/244, 245, 268, 269, 318/270, 271, 273, 274, 276, 430; 388/801, 803, 809, 816, 843, 844

[56] References Cited

U.S. PATENT DOCUMENTS

| | | | |
|---|---|---|---|
| 3,599,064 | 8/1971 | Friedman | 318/338 |
| 4,008,423 | 2/1977 | Christianson et al. | 318/338 X |
| 4,019,107 | 4/1977 | Dixon et al. | 388/806 |
| 4,037,144 | 7/1977 | Ohmae et al. | 318/338 |
| 4,052,647 | 10/1977 | Thompson | 318/139 |
| 4,224,558 | 9/1980 | Hays | 318/318 X |
| 4,247,807 | 1/1981 | Wilson | 318/338 |
| 4,284,932 | 8/1981 | Kawada et al. | 318/338 |
| 4,366,420 | 12/1982 | Omae et al. | 318/338 |
| 4,649,328 | 3/1987 | Leonard et al. | 318/271 |

FOREIGN PATENT DOCUMENTS

| | | | |
|---|---|---|---|
| 53-39420 | 4/1978 | Japan | 318/338 |
| 54-15121 | 2/1979 | Japan | 318/338 |

Primary Examiner—Bentsu Ro
Attorney, Agent, or Firm—Morgan & Finnegan

[57] ABSTRACT

In a shunt wound d.c. motor for driving centrifuges, an apparatus for obtaining smooth acceleration by regulating the bottom speed range in accordance to a preset slope current and then accelerating the armature current with full excitation. Smooth braking is also achieved by applying to the field current the full excitation during deceleration and a preset slope current thereafter.

5 Claims, 1 Drawing Sheet

MOTOR CONTROL

This is a continuation of co-pending application Ser. No. 07/328,796, filed on 3/27/89, which is a continuation of co-pending application Ser. No. 07/225,656, filed 7/15/88, which is a continuation of co-pending application Ser. No. 07/126,64 filed 12/1/87, all now abandoned.

BACKGROUND OF THE INVENTION

The invention relates to an apparatus and a method for controlling a shunt wound d.c. motor.

Shunt wound d.c. motors are the type of motors generally preferred for driving centrifuges and ultra centrifuges. Centrifuges and ultra centrifuges are used generally for separating sample substances in a liquid medium. Under certain conditions, particularly in the case of simple separations of two substances, the acceleration and braking rates are of secondary importance. However, where zonal, swing-out or vertical rotors are used with density gradients, very smooth acceleration and deceleration are of great importance, particularly at speeds between 0 and about 1200 rpm. In the case of acceleration, the density gradient is sufficiently stable after this starting phase as a result of the centrifugal force produced, thus the rotor can be brought to the final speed with full acceleration. Smooth starting acceleration can be dispensed with if self-forming gradient material is used. However, smooth deceleration is absolutely essential in order to avoid any undesirable mixing effects which would occur on maximum braking.

Known centrifuge drive motors usually have a fixed acceleration and the braking function can be switched in with a fixed braking effect. Consequently, the starting and braking rates are dependent upon the rotor mass. Where uncalibrated regulators are used, reproducibility is poor. None of the known centrifuges enables the braking slope to be regulated reproducibly independently of the rotor mass. Nor are there any known method of regulation of the braking rate below and above free deceleration. The use of lightweight and high-strength materials in the manufacture of rotors therefore precludes suitability for this type of application of density gradient centrifugation.

The object of the present invention is to provide a motor control system without the above disadvantages.

According to the apparatus and method of the present invention, the armature current is regulated with full field excitation during acceleration. During deceleration, the field current is regulated with full armature current in accordance with a signal having a defined adjustable slope.

BRIEF DESCRIPTION OF THE DRAWINGS

One exemplified embodiment of the invention will be described below with reference to the accompanying drawings wherein.

DETAILED DESCRIPTION

The control system according to the present invention enables motor speed control with field current variations at the lower speed ranges. FIG. 2 shows the absolute symmetry of the acceleration and deceleration times obtainable using the circuit as shown in FIG. 1.

Figure 1:
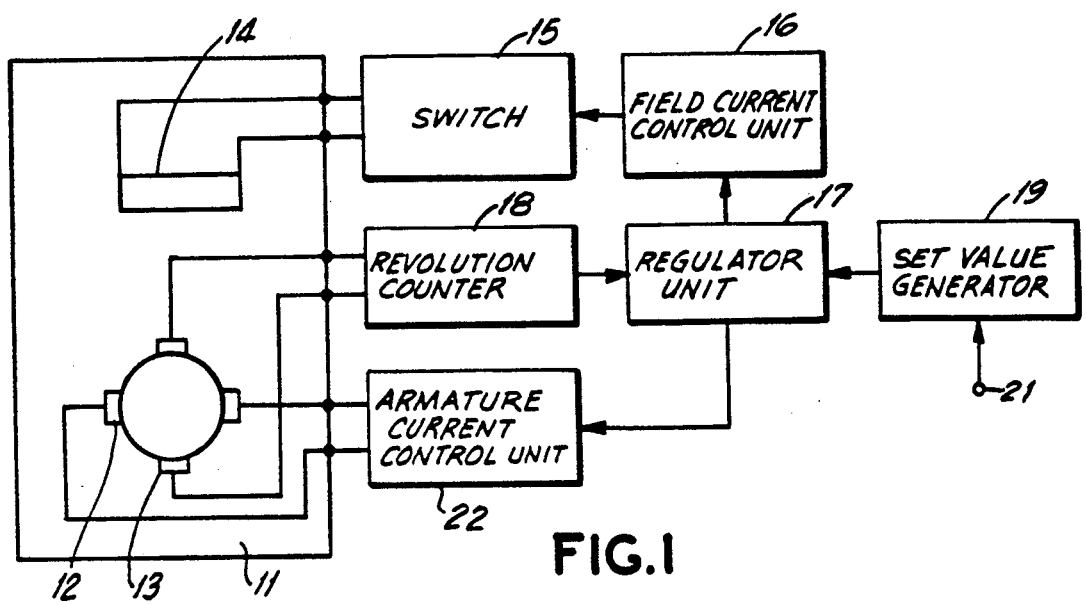
FIG. 1 is a block diagram of a control system according to the invention.
Figure 2:
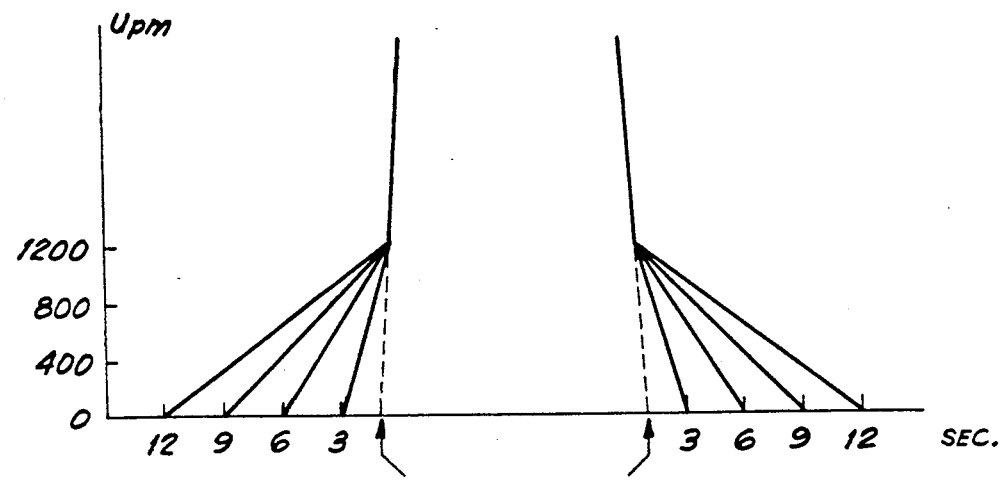
FIG. 2 is a graph of the rotor speed with different starting and braking rates.

FIG. 1 is a schematic diagram of a motor control system according to the present invention. A shunt wound d.c. motor 11 is shown having armature windings 12, tachometer windings 13 and field windings 14. The tachometer windings measure the speed of the motor. A motor of this kind also has auxiliary windings connected in series with the armature windings 12 but they are not shown here.

The field windings or coils 14 are connected to a field current control unit 16 via a switch 15. The switch is used to reverse the polarity of the field current during the braking operation. Field current control unit 16 provides the field current to the field windings 14. Correspondingly, the armature windings 12 are connected to an armature current control unit 22. The two control units 16 and 22 deliver a constant maximum current as required for full acceleration and braking. The two units also maintain maximum speed and provide a lower current for a flatter starting or braking curve. The two control units 16 and 22 are connected to a regulator unit 17. One signal input of this unit 17 is connected to a revolution counter 18 which in turn is connected to the tachometer windings 13. Revolution counter 18 generates a speed signal from the signal produced by the tachometer windings 13 and this signal is fed to the regulator unit as an actual-value signal.

A second input of the regulator unit 17 is connected to a set-value generator 19. In the present exemplified embodiment, generator 19 is a microprocessor which generates a slope signal from data input manually at 21. This slope signal is fed as a set-value to the regulator unit 17. Regulator Unit 17 carries out a set-value/actual-value comparison and delivers corresponding control signals to the two current control units 16 and 22.

Figure 3:
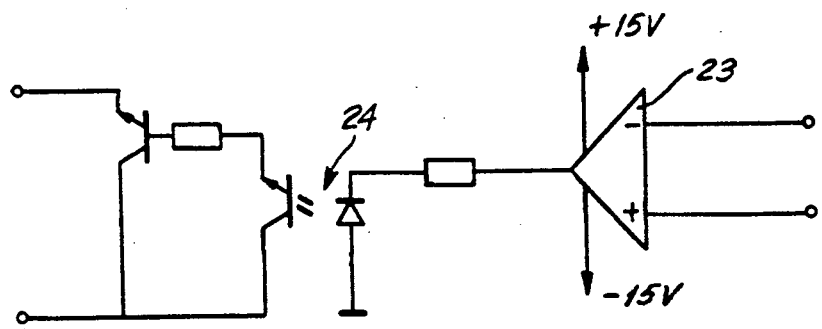
FIG. 3 is a circuit schematic diagram of the regulator unit in the motor control system of the present invention.

The regulator unit 17 is shown in detail in FIG. 3. The actual-value and set-value signals are available in the form of voltages at the respective inputs to the regulator unit. The voltages are fed to a comparator circuit 23, which delivers a differential signal at its output. This differential signal is transmitted to the power side via an optical coupler 24 and fed, for example, to the field control system.

The control system operates as follows: for the acceleration phase the field windings are connected directly to the supply voltage. The manually preselected acceleration rate is fed by the microprocessor 19 to the regulator unit 17. The set-value represents a voltage rising as a slope from 0 to 0.6 V. The value of 0.6 volts corresponds to a speed of 1200 rpm. This speed has empirically been found to be the approximate critical value above which the zone separating surfaces are so stable that there is no further mixing irrespective of the braking or acceleration rate.

Once the speed of 1200 rpm has been reached, the set-value signal is switched to 12 V so that the motor is accelerated to reach maximum speed in the shortest possible time.

At the end of the preset centrifugation time or in the event of some other interruption to operation, a stop signal occurs and has the following effect: the field polarity is changed, a resistor is connected in series with the motor armature and set-value input of the motor control system is connected to +12 V. Consequently, the motor is braked with the same current as that with which it is accelerated. The microprocessor set-value input is reduced to 1200 rpm - 0.6 V by the stop signal. As long as the actual speed is greater than 1200 rpm, a positive signal appears at the output of the comparator 2 and lets the full field current flow in the field windings from the field current control unit 16. When the speed reaches 1200 rpm, the deceleration slope shown in FIG. 2 is started.

The comparison of set-value and actual-value in the comparator 23 causes the field to be increased or reduced according to the slope input. When the field current is switched off, the motor briefly accelerates due to the excitations from the auxiliary windings. The entire range from maximum braking up to the brief acceleration is obtained by reversing the field current.

We claim:

1. An apparatus for controlling a shunt wound d.c. motor for driving centrifuges comprising:
    first control means for controlling field current; second control means for controlling armature current;
    regulation means for regulating said first and second control means with a presettable slope signal and a full excitation signal;
    means for presetting said slope signal and for delivering acceleration and deceleration data to said regulation means; and
    counter means for determining motor speed and for feedback of said speed data to said regulation means.

2. An apparatus according to claim 1, wherein said regulation means and said means for presetting include a microprocessor.

3. An apparatus according to claim 1, wherein said full excitation signal is applied upon said motor reaching a predetermined motor speed during acceleration and during deceleration, said preset slope signal is applied upon said motor speed falling to said predetermined speed.

4. A method of controlling a shunt wound d.c. motor with armature and field current for driving centrifuges comprising:
    starting the motor with a presettable slope armature current until a predetermined speed is reached;
    applying a maximum excitation current to accelerate said motor upon said motor reaching said predetermined speed;
    decelerating said motor by applying the field current to the same amount of excitation current as applied during motor acceleration by reversing the field polarity applied to said motor;
    braking said motor with said presettable slope signal applied to the field current upon said motor speed falling to said predetermined speed.

5. A method according to claim 4, wherein said predetermined speed is not greater than 1200 rpm.

* * * * *